(12) United States Patent
Nuss et al.

(10) Patent No.: US 10,231,140 B2
(45) Date of Patent: Mar. 12, 2019

(54) SELF OPTIMIZING RESIDENTIAL AND COMMUNITY WIFI NETWORKS

(71) Applicant: Cisco Technology, Inc., San Jose, CA (US)

(72) Inventors: Ziv Nuss, Tsur Yigal (IL); Alon Ben Ami, Gedera (IL); Mark Grayson, Maidenhead (GB)

(73) Assignee: Cisco Technology, Inc., San Jose, CA (US)

( * ) Notice: Subject to any disclaimer, the term of this patent is extended or adjusted under 35 U.S.C. 154(b) by 201 days.

(21) Appl. No.: 15/275,398

(22) Filed: Sep. 25, 2016

(65) Prior Publication Data

US 2017/0094535 A1 Mar. 30, 2017

Related U.S. Application Data

(60) Provisional application No. 62/232,034, filed on Sep. 24, 2015.

(51) Int. Cl.
*H04W 24/02* (2009.01)
*H04W 36/00* (2009.01)
(Continued)

(52) U.S. Cl.
CPC .......... *H04W 24/02* (2013.01); *H04B 17/318* (2015.01); *H04B 17/336* (2015.01);
(Continued)

(58) Field of Classification Search
CPC .................................................. H04W 24/02
(Continued)

(56) References Cited

U.S. PATENT DOCUMENTS 9,167,444 B2 10/2015 Nuss et al.
9,326,150 B2 4/2016 MacDonald et al.
(Continued)

FOREIGN PATENT DOCUMENTS

CN 102300229 1/2014

OTHER PUBLICATIONS

Battiti, Roberto et al.; Global Growth of Open Access Networks: From Warchalking and Connection Sharing to Sustainable Business (2003); . In Proceedings of the 1st ACM Int'l workshop on Wireless mobile applications and services on WLAN hotspots ACM, New York, NY, USA.
Klein, Andreas; Context Awareness for Enhancing Heterogeneous Access Management and Self-Optimizing Networks (2014); (Doctoral dissertation, Technische Universität Kaiserslautern).
(Continued)

*Primary Examiner* — Shripal K Khajuria

(57) ABSTRACT

A method for improving performance in a residential/community WiFi network is implemented on a self-optimizing network (SON) server and includes: receiving current configuration details and local performance statistics from SON clients installed in access points (APs) in the residential/community WiFi networks, where at least one of the APs is a residential AP configured to provide WiFi connectivity to both authorized users of the residential AP and a community of WiFi users not associated with the residential AP, analyzing at least the current configuration details and local performance statistics to identify performance issues in the residential/community WiFi network, determining remedial actions based on the analyzing, and instructing the access points to perform the remedial actions via the SON clients.

26 Claims, 6 Drawing Sheets

(51) Int. Cl.
*H04W 36/22* (2009.01)
*H04W 52/34* (2009.01)
*H04B 17/318* (2015.01)
*H04B 17/336* (2015.01)
*H04B 17/345* (2015.01)
*H04W 84/18* (2009.01)
*H04W 84/12* (2009.01)
*H04W 52/42* (2009.01)

(52) U.S. Cl.
CPC ...... *H04B 17/345* (2015.01); *H04W 36/0094* (2013.01); *H04W 36/22* (2013.01); *H04W 52/34* (2013.01); *H04W 52/42* (2013.01); *H04W 84/12* (2013.01); *H04W 84/18* (2013.01)

(58) Field of Classification Search
USPC .......................................................... 370/352
See application file for complete search history.

(56) References Cited

U.S. PATENT DOCUMENTS

| | | | |
|---|---|---|---|
| 9,392,471 | B1 | 7/2016 | Thomas |
| 9,832,674 | B2* | 11/2017 | Ghai ..................... H04W 12/04 |
| 2008/0068217 | A1* | 3/2008 | Van Wyk ............... G01D 4/004 |
| | | | 340/870.11 |
| 2010/0232318 | A1* | 9/2010 | Sarkar ................... H04W 28/18 |
| | | | 370/254 |
| 2013/0143561 | A1 | 6/2013 | Nuss et al. |
| 2013/0210409 | A1* | 8/2013 | Grayson ............... H04W 24/02 |
| | | | 455/418 |
| 2013/0328697 | A1* | 12/2013 | Lundy ................... G08C 17/02 |
| | | | 340/870.16 |

OTHER PUBLICATIONS

Sathiaseelan, Arjuna et al.; A Feasibility Study of an In-the-Wild Experimental Public Access WiFi Network (2014); In Proceedings of the Fifth ACM Symposium on Computing for Development (ACM DEV-5 '14) ACM, New York, NY, USA, 33-42.

* cited by examiner

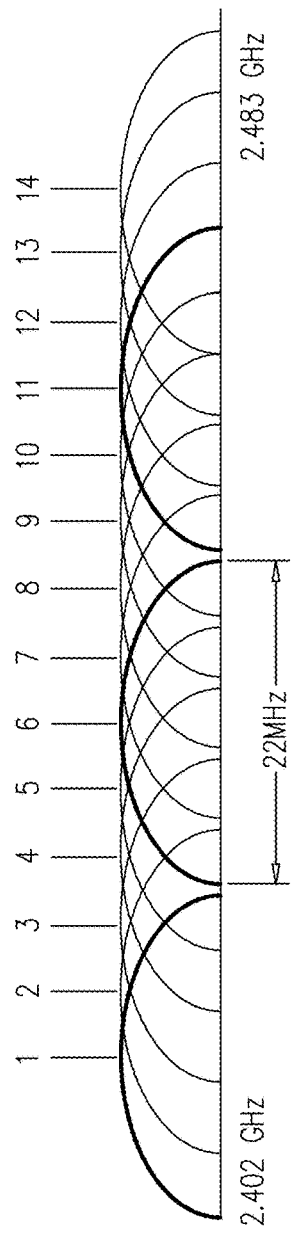
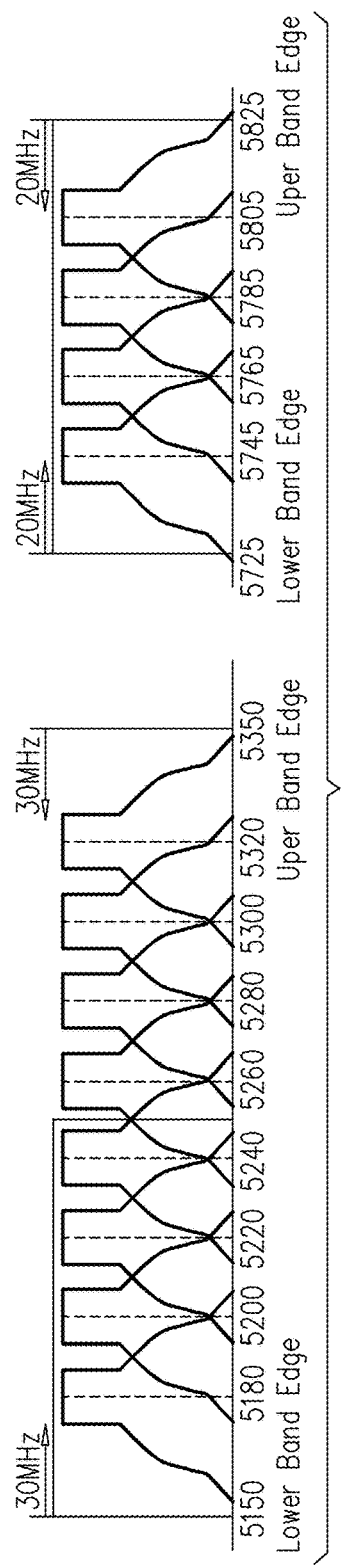
FIG. 3A
FIG. 3B

SELF OPTIMIZING RESIDENTIAL AND COMMUNITY WIFI NETWORKS

RELATED APPLICATION INFORMATION

The present application claims the benefit of priority from U.S. Provisional Patent Application Ser. No. 62/232,034, filed on Sep. 24, 2015.

FIELD OF THE INVENTION

The present invention generally relates to the optimization of residential and/or community WiFi based networks.

BACKGROUND OF THE INVENTION

Multiple service operators (MS Os) have recently been investing resources in the rollout of both massive densification of WiFi service in the residential space, as well as community WiFi (hotspots) in a nationwide deployment, with the end goal being to leverage nominally unassociated home and/or commercial devices to provide a ubiquitous, cellular like coverage layer which will be able to provide service continuity for a wide variety of services throughout the service coverage area.

BRIEF DESCRIPTION OF THE DRAWINGS

The present invention will be understood and appreciated more fully from the following detailed description, taken in conjunction with the drawings in which:

FIGS. 3A and 3B are illustrations of transmission bands used by the access points of the system of FIG. 1.

DESCRIPTION OF EXAMPLE EMBODIMENTS

Overview

Figure 1:
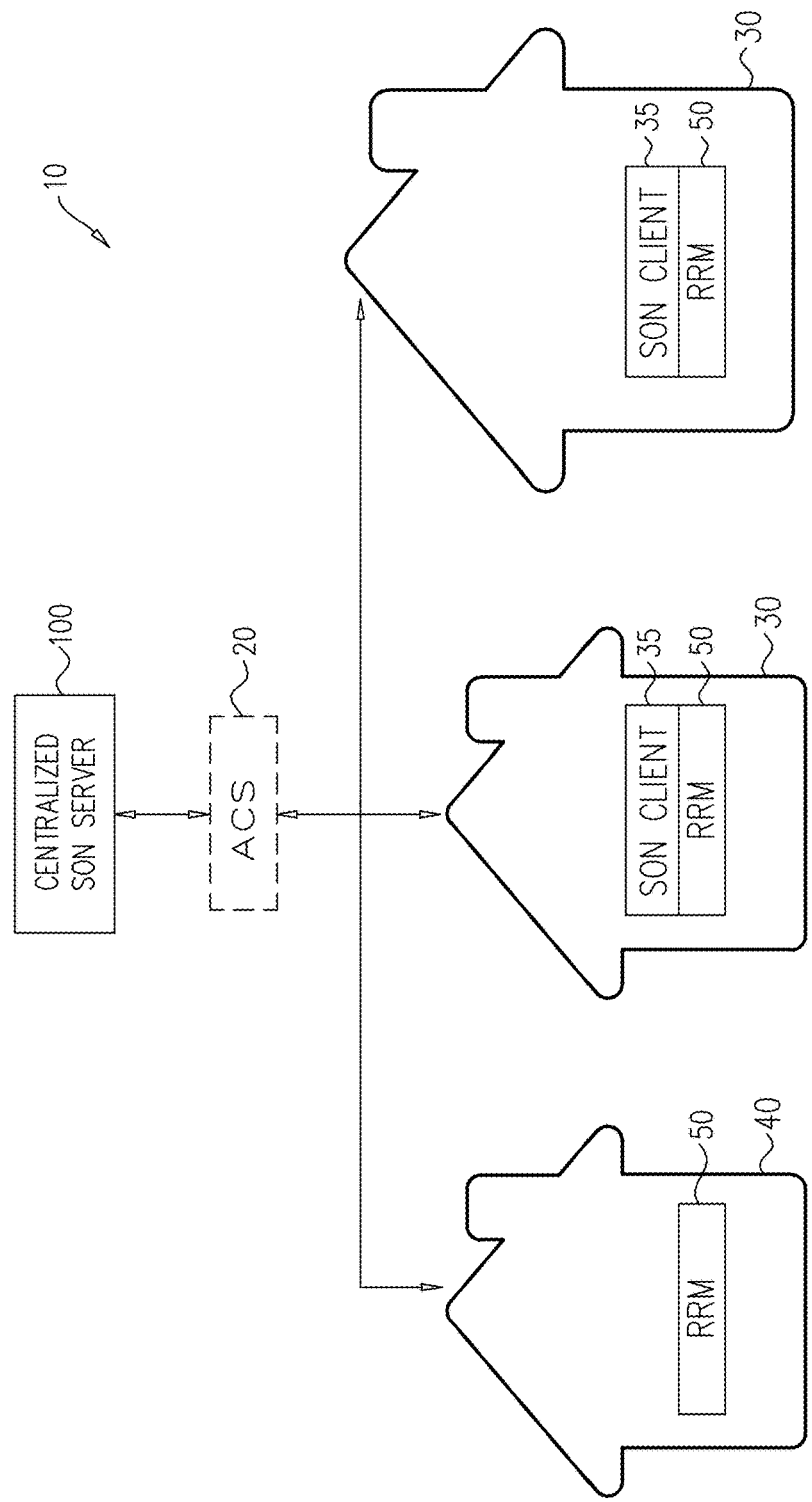
FIG. 1 is a partly pictorial illustration of an exemplary residential/community WiFi self-optimizing network, constructed and operative in accordance with embodiments described herein.
Figure 2:
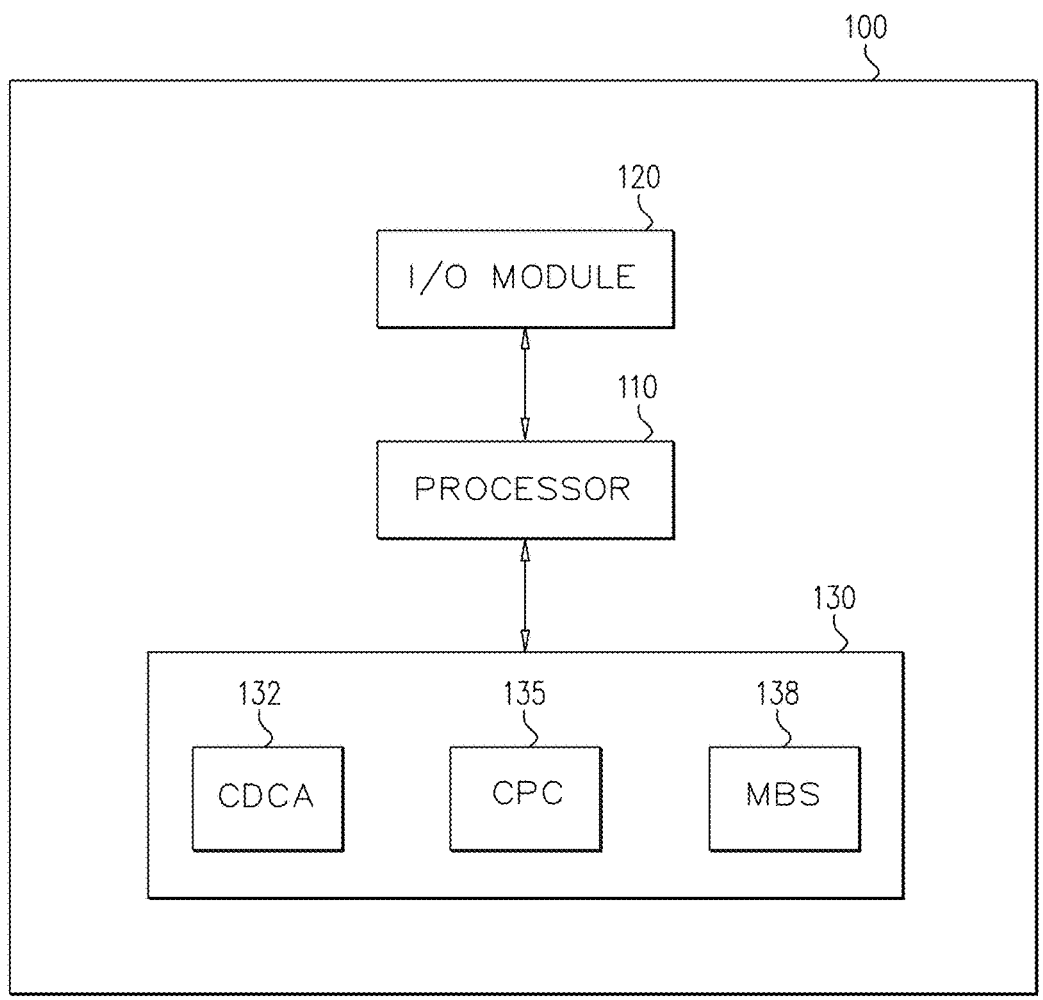
FIG. 2 is a schematic illustration of the self-optimizing server of FIG. 1.

A method for improving performance in a residential/community WiFi network is implemented on a self-optimizing network (SON) server and includes: receiving current configuration details and local performance statistics from SON clients installed in access points (APs) in the residential/community WiFi networks, where at least one of the APs is a residential AP configured to provide WiFi connectivity to both authorized users of the residential AP and a community of WiFi users not associated with the residential AP, analyzing at least the current configuration details and local performance statistics to identify performance issues in the residential/community WiFi network, determining remedial actions based on the analyzing, and instructing the access points to perform the remedial actions via the SON clients.

A residential/community WiFi network SON server includes: an I/O module operative to receive current configuration details and local performance statistics from SON clients installed in access points in the residential/community WiFi network, where at least one of the APs is a residential AP configured to provide WiFi connectivity to both authorized users of the residential AP and a community of WiFi users not associated with the residential AP, a processor, and a centralized SON application operative to be executed by the processor, where the centralized SON application includes: a centralized dynamic channel assignment function operative to determine dynamic channel assignments for the APs based on collected measurements received via the I/O module, a centralized power control (cPC) function operative to reduce or increase total transmit power for the APs based on a coverage threshold, and a multi-band steering (MBS) function operative to steer the APs to a frequency band based on their capabilities.

DETAILED DESCRIPTION OF EXAMPLE EMBODIMENTS

Controller based WiFi management solutions for enterprise deployments are known. However, using such solutions for residential and/or community deployments is problematic, particularly due to scalability. The large variance in customer-premises equipment (CPE) vendors, models and level of management support is also a significant factor. Residential/community WiFi networks seek to leverage a disparate collection of equipment that is typically not under the physical control of the MSO, rendering a centralized uniform management approach quite difficult.

Accordingly, residential/community WiFi networks typically suffer from a series of issues that are of lesser concern for conventional enterprise solutions. The service provider (SP) may struggle to balance the needs and rights of its users, both in the open as well as home domains, thereby impacting on the quality of experience (QoE) which the users may expect and receive. When deploying community WiFi service based on home residential gateways (RGs), the service may de facto compete for the same radio resources (air time) as the home networks, thereby rendering hot spot service inefficient. Deployment may also be constrained by non-optimal user association to access points (APs) from the perspective of total cluster performance (capacity etc.).

It will be appreciated by those of ordinary skill in the art that self-optimizing networks (SONs) are known in the mobile space and are predicated on the mobile operator's control of mobile cell towers and/or connection protocols with mobile handsets to facilitate a variety of optimization algorithms to improve ongoing performance of a mobile network. In accordance with embodiments described herein, such algorithms may be adapted for use by Internet Service Providers (ISPs) to optimize WiFi based self-optimizing networks that leverage naturally existing coverage provided by the excess bandwidth available to home and community access points (APs).

A significant hindrance to the adaptation of mobile SON algorithms for use in residential/commercial WiFi environments is that while mobile cell towers are typically in complete control of the mobile operator, both in terms of accessibility and configuration transparency, residential/community APs are largely (although not totally) under the control of the users. This is less of an issue where the AP or residential gateway (RG) is leased directly from the ISP. However, many such APs are owned and under the control of the end users. Under such circumstances, the ISPs not only do not have direct control of the devices, they may not be familiar with their configuration and/or even be aware of the model in use.

The system architecture of embodiments described herein may therefore be flexible to accommodate the different levels of control/information/compatibility that may be encountered vis-a-vis the deployed devices.

Reference is now made to FIG. 1 which illustrates an exemplary residential/community WiFi self-optimizing network 10. Network 10 comprises centralized SON server 100, RGs 30 and RG 40. RGs 30 and 40 represent member APs in network 10. RGs 30 comprise SON client 35 and radio resource management function (RRM) 50. RRM 50 represents a component, implemented in software, hardware or firmware that is typically implemented in residential gateways for radio resource management. SON client 35 is a component, implemented in software, hardware or firmware, for communication with server 100. RG 40 comprises RRM 50, but does not comprise SON client 35. It will be appreciated that RG 40 therefore represents a residential gateway that has not been particularly configured for use in communication with server 100.

One or more centralized SON servers 100 may be installed in the ISP's data center. Optionally there may be connectivity to an automated configuration services management system (ACS) 20, such as, for example (but not necessarily), Cisco Prime® Home. It will be appreciated by a person of ordinary skill in the art that the embodiments described herein may be implemented to interact with any commercially available ACS system. Using Cisco Prime Home as an example, ACS 20 may be effectively configured to communicate with a relevant population of RGs 30 via SON client 35, such as depicted in FIG. 1. It will be appreciated that SON client 35 may be vendor agnostic; i.e., RGs 30 as depicted in FIG. 1 may be provided by different vendors and may have different capabilities. However, SON clients 35 may provide a generally common interface for interaction with server 100.

SON server 100 may be configured to receive current configuration details and local performance statistics from SON clients 35, and use SON clients 35 to provide corrective action to the participating RGs 30. In accordance with embodiments described herein, SON server 100 may also be configured to infer performance information and/or configuration details regarding devices without an installed client (such as RG 40) based on neighboring devices with clients (i.e., RGs 30) and/or information from the provider's data network. Accordingly, non-client installed devices such as RG 40 may be at least in part optimized via settings in the data network and/or as "collateral improvements" related to changes in configuration of RGs 30.

Accordingly, SON server 100 may be configured to provide remedies for the salient issues noted above as follows:

Poor QoE that may typically be caused at least in part by high interference in dense areas and/or causes for lack of success in matching carrier grade voice standards, may be improved using cloud-based transaction power management and channel selection. As QoE improves, the evolution towards a full voice over WiFi implementation may continue.

SON server 100 may therefore identify locations where QoE is not satisfactory, according to SP policies (pre-defined in the SON platform) and will attempt to automatically fix those areas by various mechanisms such as frequency retunes, power control of Aps, etc. It is noted that there may be "rogue" APs without clients that cannot be directly manipulated by the SON (e.g., RG 40); these rouge APs may be mapped as constraints to the SON algorithms. It is expected, however, that there will be significant clusters (particularly in MDU—multi dwelling unit—environments) that will have a substantial percent of APs from the same SP, thereby facilitating effective central control.

Server 100 may improve inefficient hotspot service by optimizing home network parameters and load-balancing between hotspots to reduce excessive default safety margins with minimal damage to the base home service. Managing this inherent tradeoff may be done conservatively, implementing safety margins that will limit the service level that can be provided by hotspot service (e.g. only up to 2-3 users per AP or similar restrictions). However, SON server 100 may be configured to manage these limitations dynamically; accordingly, over time the limitations may be fine-tuned to become sensitive to the real impact this service has on the home users. Additionally, a server 100 may be able configured to deploy load balancing algorithms between APs that will optimize the spatial available radio resources based on dynamic traffic distribution.

With regard to deployment constraints, server 100 will be configured to evaluate performance and optimization on a cluster level (a cluster being comprised of multiple geographically related APs), thereby providing a more complete solution and enabling de facto optimization of the rogue devices without clients. Centralized radio resource management thusly implemented in server 100 may provide "sticky bad apple" management, optimize device settings, and provide multi-band management as measures to address sub-optimal user association and various coverage and capacity issues.

In accordance with embodiments described herein, server 100 may be configured to provide centralized dynamic channel assignment (cDCA). cDCA may include dynamic channel assignments to APs based on collected measurements from APs while taking into account the inter relations between the APs in order to accomplish interference management for better spectrum management and improving spectral efficiency, and system capacity.

In accordance with embodiments described herein, server 100 may also be configured to provide Coverage and Capacity Optimization (CCO) functionality to the devices in network 10. This functionality may be comprised of several sub-functions that work in conjunction with each other, in order to accomplish better cluster performance and user experience within the cluster. For example: a centralized power control (cPC) function may be operative to reduce or increase AP total transmit power in order to solve coverage problems on one hand, but to avoid, and/or reduce, the interference induced by the AP in other cases. An optimal user Association Control (cOA) function may be operative to provide a best user association scheme so that overall cluster performance is optimized for all the users, not just for a specific user. A multi band steering (MBS) function that based on an AP with dual-band, dual-concurrent (DBDC) capabilities, may map users according to their capabilities and steer them to most effectives bands based on their capabilities, radio conditions, and traffic consumption, as well as based on the target band loading and quality instantaneous levels.

In accordance with embodiments described herein, server 100 may also be configured to provide hybrid hotspot (community WiFi) air time management (cATM) thereby balancing between home and hotspot usage, preventing situations in which a community WiFi user, presumably located in poor RF conditions, can use up large amount of the AP resources and thus degrade the service to home users receiving service from this AP.

In accordance with embodiments described herein, server 100 may also be configured to provide dynamic load balancing (cDLB) including IEEE 802.11ac settings by using centralized SON information about the radio topology relations between APs deployed in a certain area, to offload momentarily loaded APs to relevant neighbor APs.

In accordance with embodiments described herein, server 100 may also be configured to provide mobility optimization (cMO). cMO is comprised of several sub-functions that work in conjunction with each other, in order to accomplish improved cluster performance and user experience within the cluster. For example: a fast mobility mitigation (FHM—Frequent Handover Mitigation) function may be operative to prevent a fast moving user from camping on a managed AP, thereby preventing compromised system performance caused by excessive signaling and handovers. A function for session continuity optimization including key distribution support may be operative to control the delay associated with keys distribution by providing a list of relevant handover targets by server 100 to relevant system elements. A VoWiFi (voice over WiFi) optimization function may provide seamless mobility and interference control. An interworking function to coordinate optimization with a mobile network may also be provided.

Reference is now also made to FIG. 1 which is a block diagram of a computing centralized SON server 100 constructed and operative in accordance with embodiments described herein to provide an exemplary centralized SON application 130 configured to provide SON services to network 10 as described herein. Server 100 may be implemented as any suitable computing device such as, but not limited to, a personal computer, laptop computer, computer tablet, or smartphone that may be operative to provide the functionality described herein. It will be appreciated that in operation, the functionality of server 100 may be implemented on multiple such computing devices; server 100 may be depicted herein as a single device for the purposes of convenience and/or clarity.

It will be appreciated by one of skill in the art that server 100 comprises hardware and software components that may provide at least the functionality of the embodiments described herein. For example, server 100 may comprise at least processor 110, I/O module 120, and centralized SON application 130. I/O module 120 may be implemented as a transceiver or similar means suitable for transmitting and receiving data between computing server 100 and another device. Such data received may be, for example, represent performance data received either directly or indirectly from RGs 30 and 40. Data transmitted from server 100 may be, for example, instructions sent to RGs 30 and/or an administrative function for network 10.

Centralized SON application 130 may be any suitable application implemented in software and/or hardware that may be operative to facilitate the optimization of APs in network 10 as described herein.

It will be appreciated that server 100 may comprise more than one processor 110. For example, one such processor 110 may be a special purpose processor operative to execute centralized SON application 130. Centralized SON application 130 comprises centralized dynamic channel assignment function (cDCA) 132, centralized power control function (cPC) 135, and multi-band steering function (MBS) 138, each of which may be implemented in software and/or hardware and may be employed as necessary by centralized SON application 130 to monitor, analyze, and/or optimize various aspects of WiFi performance in RGs 30 and 40.

Reference is now made to FIG. 3A which depicts current channel allocations in the 2.4 Ghz band. As depicted in FIG. 3A, the 2.4 Ghz band comprises overlapping channels of 22 Mhz width that are spaced every 5 Mhz in the band. Accordingly, in operation, it may be possible to use only three channels without interference in a common location, typically channels 1, 6, and 11 as indicated by the emphasized channels in FIG. 3A. It will be appreciated by one of ordinary skill in the art, that for at least this reason, APs are commonly pre-set to use one of these three channels.

Reference is now made to FIG. 3B which depicts current channel allocations in the 5 Ghz band. As depicted in FIG. 3B, the 5 Ghz band comprises non-overlapping channels, thereby enabling simultaneous use of each channel in the 5 Ghz band without interference in a common location. It will be appreciated that only some APs may be configured to use the 5 Ghz band; but it will also be appreciated that the 5 Ghz may be used to alleviate congestion/interference in the 2.4 Ghz band.

In accordance with embodiments described herein, cDCA 132 may be employed by server 100 to address interference between access points using overlapping frequencies in the 2.4 Ghz band by using performance data from RGs 30 and 40 to dynamically reassign channels (typically set at initial configuration) to achieve higher throughput and coverage. Accordingly, cDCA may include functionality for receiving and processing individual AP radio scans; scanning reports fed back by SON client 35 to server 100; building an inter-AP interference matrix based on reported BSSIDs (basic service set identifiers) where each AP can map RSSI (received signal strength indicator) from surrounding APs; calculating an overlap between neighboring APs to facilitate intelligent discovery of topology/geography based on the received data; and employing a dynamic channel selection algorithm to exploit all available WiFi channels in both the 2.4 Ghz and 5 Ghz bands.

Figure 4:
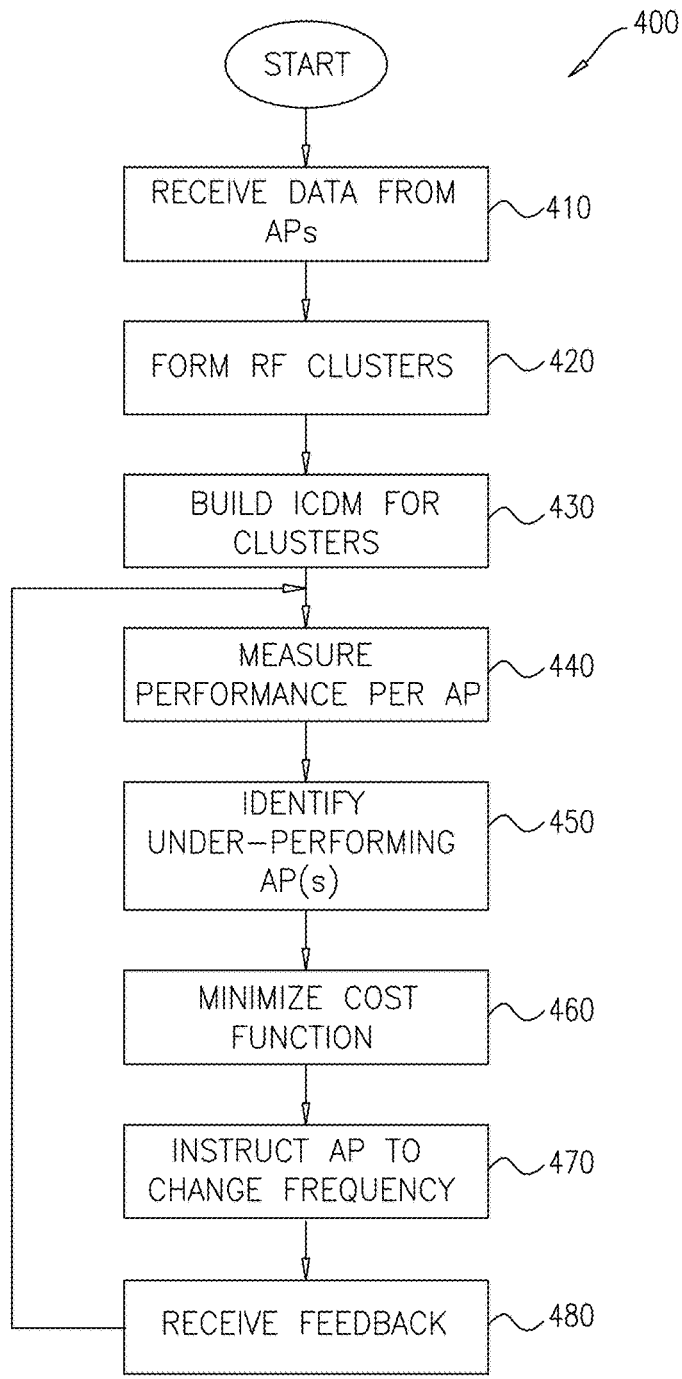
FIGS. 4-6 are flowcharts of processes performed by the self-optimizing server of FIG. 2.

Reference is now made to FIG. 4 which is a flowchart of a cDCA process 400 to be performed by cDCA 132 in accordance with embodiments described herein. cDCA 132 may receive (step 410) performance data either directly or indirectly from RGs 30 and 40. The received performance data may facilitate topology discovery vis-a-vis RGs 30 and 40 within network 10. Based on a perceived topology, cDCA may form clusters of APs (e.g., RGs 30 and 40) according to radio frequency (RF data received in step 410.

cDCA 132 may build (step 430) an inter-cell dependency matrix (ICDM) for each of the APs in a given cluster. cDCA 132 may measure (step 440) the performance for each of the APs. For example, measuring interference per channel, measuring load per channel (saturation), measuring AP capacity, measuring user RSSI/signal-to-noise ratios (SNRs) and throughputs between APs in the ICDM.

Based on the performance measurements of step 440, cDCA may identify (step 450) one or more underperforming APs in the cluster. cDCA may minimize (step 460) a cost function for changing the frequency used for the worst performing AP of the APs identified in step 450, and based on the results of the function, instruct the AP to change the frequency, i.e., channel, used by the AP.

cDCA may receive (step 480) feedback regarding the efficacy of the instruction to change frequency in the form of performance data generally similar to that received in step 410. Processing control may then return to step 440 to reassess the performance of the APs in the RF cluster. It will be appreciated that process 400 may be implemented with an anti-oscillation mechanism based on the feedback received in step 480 to prevent never-ending repeating correction loops. For example, cDCA may track such repeating corrections and impose a processing delay when the same correction is input and reversed X number of times. Alternatively, or in addition, cDCA may be configured to skip optimization of one or more such oscillating APs in favor of other under-performing APs that have not yet been processed.

In accordance with embodiments described herein, cPC 135 may address interference between Access Points caused by excessive power based on user measurements (typically set at maximum by default) to achieve higher throughput and coverage. Accordingly, cPC may implement coverage vs interference tradeoff management, based on AP reports including associated users (home, public) to all SSIDs (service set identifiers) and their RF conditions, for both download (DL) and upload (UL). It will be appreciated that in current deployments, most APs are set by default to max power, leading to unnecessary interferences. cPC 135 may therefore map the coverage level of each SSID and match it to desired thresholds (e.g. for managed video SSID the desired coverage threshold may be >75 dBm), and reduce/increase power where applicable. Accordingly, this feature may optimize the power transmitted by APs to maintain sufficient power levels in home coverage while minimizing the external interference caused by the AP.

Figure 5:
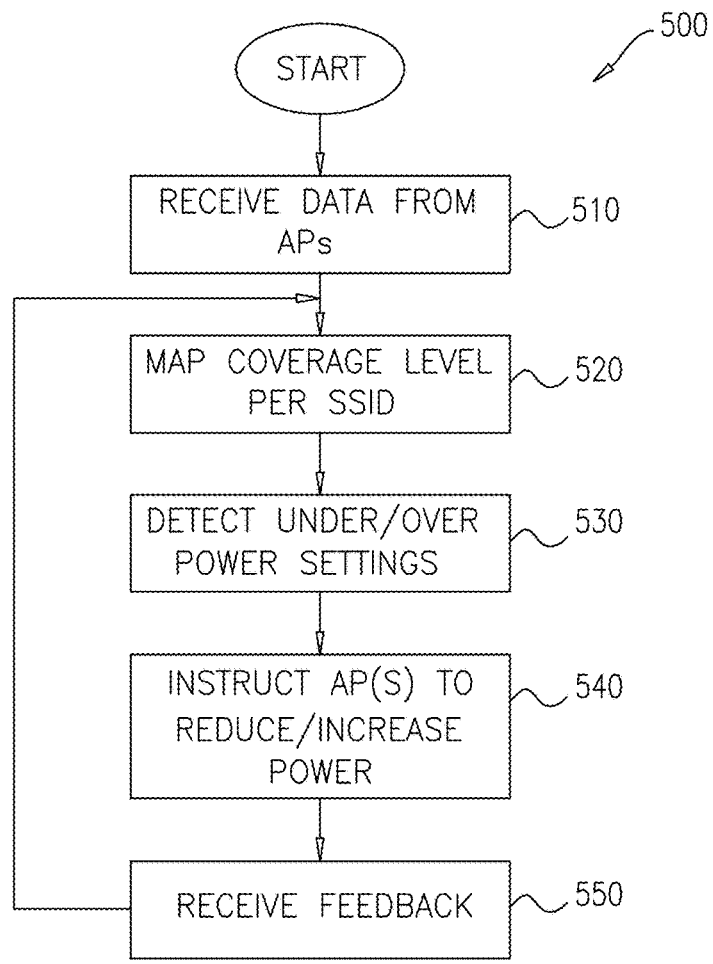

Reference is now made to FIG. 5 which is a flowchart of a cPC process 500 to be performed by cPC 135 in accordance with embodiments described herein. cPC 135 may receive (step 510) performance data either directly or indirectly from RGs 30 and 40. It will be appreciated that step 510 may be performed as part of a generic data collection step together with step 410.

cPC 135 may use the received performance data to map (step 520) coverage levels per SSID. Based on the map from step 420, cPC 135 may detect (step 530) potential over/under-powered conditions in one or more associated APs, and instruct (step 540) the AP(s) to reduce/increase power accordingly.

cPC may receive (step 550) feedback regarding the efficacy of the instruction to reduce/increase power in the form of performance data generally similar to that received in step 510. Processing control may then return to step 520 to remap the coverage level of the affected AP(s). It will be appreciated that process 500 may be implemented with an anti-oscillation mechanism based on the feedback received in step 550 to prevent never-ending repeating correction loops. For example, cPC may track such repeating corrections and impose a processing delay when the same power adjustment is input and reversed X number of times. Alternatively, or in addition, cPC may be configured to compensate for non-optimal power consumption by a given AP by adjusting the power consumption of a one or more neighboring APs.

In accordance with embodiments described herein, multi-band steering (MBS) addresses load balancing between 2.4 Ghz and 5 Ghz bands by moving static devices to the 5 Ghz band without losing coverage to provide a cleaner 2.4 Ghz layer for voice applications. This entails forcing user devices to be associated with different SSIDs possibly in contradiction to their default association decision (RSSI based). This association policy may be managed based on service type and/or user type (mobile/stationary or other). Accordingly, multi-band steering may provide: a cleaner 2.4G band that may be leveraged as a contiguous coverage band for VoWiFi service, and reduced hotspot/home contention on the coverage band.

Figure 6:
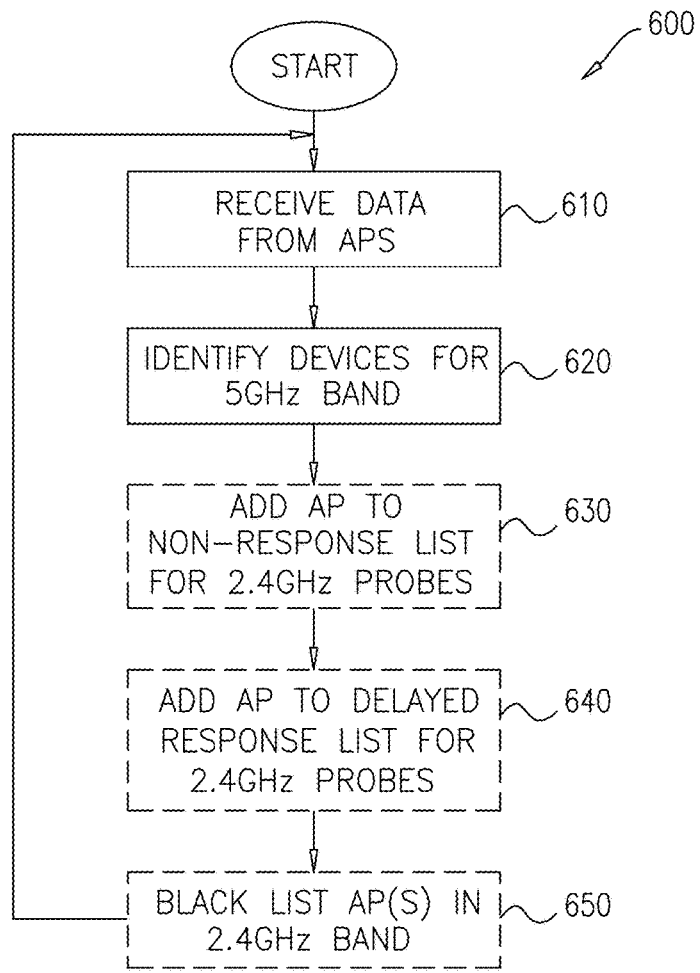

Reference is now made to FIG. 6 which is a flowchart of an MBS process 600 to be performed by MBS 138 in accordance with embodiments described herein. MBS 138 may receive (step 610) performance data either directly or indirectly from RGs 30 and 40. It will be appreciated that step 610 may be performed as part of a generic data collection step together with step 410 and/or 510.

MBS 138 may use the received performance data to identify (step 620) devices that may preferably use the 5 Ghz band instead of the 2.4 Ghz. Such identification may be predicated at least on a capability of the associated device to operate on the 5 Ghz band (as noted hereinabove, not all APs are configured with the functionality for using the 5 Ghz band). Other factors that may be considered include, for example, the type of services used by the device and/or a user type, i.e., mobile or stationary.

After an AP has been identified in step 620, MBS 138 may employ a variety of steps to steer the AP to the 5 Ghz band. For example, MBS 138 may use passive steering. Examples of possible passive steering steps may include MBS 138 adding (step 630) the AP to a non-response list for 2.4 Ghz probes. It will be appreciated that an AP may initiate a probe for a given channel/band before selecting the channel/band for use. In the absence of a response to such a probe, an AP may be passively dissuaded from using a given channel/band. Alternatively, MBS 138 may add (step 640) the AP to a delayed response list for 2.4 Ghz probes; MBS 138 may instruct the ISP to not respond to N probe requests from a user on 2.4 Ghz, but then respond to the N+1 probe request, thereby not preventing the AP from using a channel in the 2.4 Ghz, but rather encouraging it to seek an available channel in the 5 Ghz band to avoid the delays in response to its probes.

Alternatively, MBS 138 may employ active steering. For example, MBS 138 may blacklist (step 650) an AP in the 2.4 Ghz band.

It will be appreciated that process 600 may comprise feedback functionality similar to that described with respect to steps 480 and/or 550 in processes 400 and 500, respectively.

It will be appreciated by one of ordinary skill in the art that the embodiments described herein, either singly, or in combination, may enable optimizing configuration of WiFi based residential/commercial networks by adapting known SON methods from the mobile space and accounting for lack of physical control/access of/to the WiFi access points. Implementation of some or all of these embodiments may therefore facilitate a new emerging business model for ISPs to provide broad coverage via community/residential WiFi networks.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for improving performance in a residential/community WiFi network, the method implemented on a self-optimizing network (SON) server and comprising:

receiving current configuration details and local performance statistics from SON clients installed in access points (APs) in said residential/community WiFi network, wherein at least one of said APs is a residential AP configured to provide WiFi connectivity to both authorized users of said residential AP and a community of WiFi users not associated with said residential AP;

analyzing at least said current configuration details and local performance statistics to identify performance issues in said residential/community WiFi network;

determining remedial actions based on said analyzing; and instructing said access points to perform said remedial actions via said SON clients.

2. The method according to claim 1 and further comprising:

receiving additional configuration and performance details from an Internet service provider (ISP) associated with said APs, wherein said analyzing further comprises analyzing said additional configuration and performance details.

3. The method according to claim 2 and wherein:

there are rogue APs in said residential/community WiFi network, wherein said rogue APs do not have said SON clients; and said analyzing further comprises inferring said current configuration details and performance for said rogue APs from said additional configuration and performance details.

4. The method according to claim 1 and wherein one of said remedial actions is instructing at least one of said APs to adjust power output.

5. The method according to claim 4 and wherein said analyzing further comprises:

analyzing a coverage level on a per SSID (service set identifier) basis.

6. The method according to claim 4 and wherein said instructing comprises:

instructing said at least one of said APs to adjust power output to match a defined coverage threshold.

7. The method according to claim 1 and wherein one of said remedial actions is instructing at least one of said APs to use a different channel frequency.

8. The method according to claim 7 and further comprising:

clustering APs in said residential/community WiFi network;

mapping an inter-cell dependency matrix (ICDM) for each of said APs in a given cluster;

measuring performance for said given cluster; and identifying at least one under-performing AP in said given cluster according to said measuring, wherein said instructing comprises instructing said at least one under-performing AP to switch to said different channel frequency.

9. The method according to claim 8 and wherein said measuring comprises at least one of:

measuring interference per channel;
measuring load per channel;
measuring AP capacity;
measuring user received signal strength indicator/signal-to-noise ratios (RSSI/SNRs); or
measuring throughputs between said APs in said given cluster.

10. The method according to claim 8 and wherein said identifying comprises:

minimizing a cost function to determine which said at least one underperforming AP to switch to which said different channel frequency.

11. The method according to claim 1 and wherein one of said remedial actions is steering at least one of said APs to use a specific frequency band.

12. The method according to claim 11 and wherein said analyzing comprises:

determining which of said APs is a 5 Ghz band capable AP.

13. The method according to claim 12 and further comprising:

adding said 5 Ghz band capable AP to a non-response list for 2.4 Ghz band probes in said residential/community WiFi network.

14. The method according to claim 12 and further comprising:

adding said 5 Ghz band capable AP to a delayed-response list for 2.4 Ghz band probes in said residential/community WiFi network, wherein a first N probes received from a device in said delayed-response list are ignored.

15. The method according to claim 12 and further comprising:

blacklisting said 5 Ghz band capable AP from 2.4 Ghz band operation.

16. The method according to claim 12 and wherein said instructing comprises:

instructing said 5 Ghz band capable AP to use a 5 Ghz band channel.

17. The method according to claim 1 and further comprising:

subsequent to said instructing, receiving feedback regarding AP performance; and repeating said analyzing in light of said feedback.

18. The method according to claim 17 and further comprising:

limiting said repeating to prevent an oscillating effect wherein one or more of said remedial actions are performed and reversed in a loop.

19. One or more non-transitory computer readable storage media encoded with instructions that, when executed by a processor, cause the processor to:

receive current configuration details and local performance statistics from SON clients installed in access points (APs) in said residential/community WiFi network, wherein at least one of said APs is a residential AP configured to provide WiFi connectivity to both authorized users of said residential AP and a community of WiFi users not associated with said residential AP;

analyze at least said current configuration details and local performance statistics to identify performance issues in said residential/community WiFi network;

determine remedial actions based on said analyzing; and instruct said access points to perform said remedial actions via said SON clients.

20. A residential/community WiFi network self-optimizing network (SON) server comprising:

an I/O module operative to receive current configuration details and local performance statistics from SON clients installed in access points (APs) in said residential/community WiFi network, wherein at least one of said APs is a residential AP configured to provide WiFi connectivity to both authorized users of said residential AP and a community of WiFi users not associated with said residential AP;

a processor; and a centralized SON application operative to be executed by said processor, wherein said centralized SON application comprises:
- a centralized dynamic channel assignment function operative to determine dynamic channel assignments for said APs based on collected measurements received via said I/O module,
- a centralized power control (cPC) function operative to reduce or increase total transmit power for said APs based on a coverage threshold, and
- a multi-band steering (MBS) function operative to steer said APs to a frequency band based on their capabilities.

21. The one or more non-transitory computer readable storage media of claim 19, wherein the instructions, when executed by the processor, further cause the processor to receive additional configuration and performance details from an Internet Service Provider (ISP) associated with said APs, wherein said analyzing further comprises analyzing said additional configuration and performance details.

22. The one or more non-transitory computer readable storage media of claim 19, wherein there are rogue APs in said residential/community WiFi network, wherein said rogue APs do not have said SON clients, and wherein the instructions, when executed by the processor, further cause the processor to the infer said current configuration details and performance for said rogue APs from said additional configuration and performance details.

23. The one or more non-transitory computer readable storage media of claim 19, wherein one of said remedial actions is steering at least one of said APs to use a specific frequency band.

24. The residential/community WiFi network SON server of claim 20, wherein the centralized dynamic channel assignment function is further operative to instruct at least one of said APs to use a different channel frequency.

25. The residential/community WiFi network SON server of claim 20, wherein the cPC function is further operative to instruct at least one of said APs to adjust power output.

26. The residential/community WiFi network SON server of claim 25, wherein the cPC function being operative to instruct includes the cPC function being operative to:
- cluster APs in said residential/community WiFi network;
- map an inter-cell dependency matrix (ICDM) for each of said APs in a given cluster;
- measure performance for said given cluster; and
- identify at least one under-performing AP in said given cluster according to said measuring, wherein said instructing comprises instructing said at least one under-performing AP to switch to said different channel frequency.

* * * * *